US007001105B2

(12) United States Patent
Bruso

(10) Patent No.: US 7,001,105 B2
(45) Date of Patent: Feb. 21, 2006

(54) METHOD OF IN SITU BLENDING OF SOIL TO REDUCE CONCENTRATION OF TOXIC RESIDUE IN THE SOIL

(76) Inventor: Bruce L. Bruso, R.R. 1 Box 1T, East Mountain Rd., Hegins, PA (US) 17938

( * ) Notice: Subject to any disclaimer, the term of this patent is extended or adjusted under 35 U.S.C. 154(b) by 51 days.

(21) Appl. No.: 10/817,498

(22) Filed: Apr. 2, 2004

(65) Prior Publication Data

US 2004/0223811 A1 Nov. 11, 2004

Related U.S. Application Data

(60) Provisional application No. 60/460,272, filed on Apr. 3, 2003.

(51) Int. Cl.
*B09B 1/00* (2006.01)

(52) U.S. Cl. ................................ 405/128.1; 405/128.75

(58) Field of Classification Search ............. 405/128.1, 405/128.15, 128.45, 128.5, 128.7, 128.75
See application file for complete search history.

(56) References Cited

U.S. PATENT DOCUMENTS

| | | | | |
|---|---|---|---|---|
| 5,631,160 A | | 5/1997 | Bruso | 435/262.5 |
| 5,830,752 A | * | 11/1998 | Bruso | 405/128.55 |
| 6,422,789 B1 | * | 7/2002 | Brewer | 405/128.75 |
| 6,543,963 B1 | | 4/2003 | Bruso | 405/128.15 |

FOREIGN PATENT DOCUMENTS

| | | |
|---|---|---|
| CA | 2162029 | 4/2003 |
| WO | WO9425191 A1 | 11/1994 |

OTHER PUBLICATIONS

New Jersey Historic Pesticide Contamination Task Force Final Report "Findings and Recommendations for the Remediation of Historic Pesticide Contamination" Mar. 1999.*

Guidelines for the Vertical Mixing of Soil on Former Broad-Acre Agricultural Land, published by New South Wales Environmental Protection Agency. First published Jan. 1995.

* cited by examiner

*Primary Examiner*—John Kreck
(74) *Attorney, Agent, or Firm*—Drinker Biddle & Reath LLP

(57) ABSTRACT

An in situ method of reducing concentrations of contaminates in contaminated soil, where contaminated soil positioned in a first horizontal location is in situ mixed with clean soil in vertical proximity to the contaminated soil. The mixed soil is blended under conditions and for a time sufficient to substantially homogenize the contaminants in the blended soil. The mixing and blending is then repeated for a second horizontal location.

8 Claims, 1 Drawing Sheet

METHOD OF IN SITU BLENDING OF SOIL TO REDUCE CONCENTRATION OF TOXIC RESIDUE IN THE SOIL

RELATED APPLICATION

This application claims the benefit of provisional application Ser. No. 60/460,272, filed Apr. 3, 2003.

FIELD OF INVENTION

The present invention relates to the general field of remediating contaminated soils, and to the more specific field of methods of remediating soil in situ.

BACKGROUND OF INVENTION

Over the years, pesticides have been repeatedly applied to agricultural farmlands to promote crop growth. (The term "pesticide" is used herein to include both insecticides and fungicides.) The agricultural pesticides and/or their toxic residue, by their nature, tend to become tightly bound to soil particles, particularly fine soil (clays), and to organic matter in the soil. Many are not water-soluble. These properties inhibit downward migration from the ground surface (where the pesticides were generally applied) into the soil column. The result is that, even years after the pesticides were applied to the land, the concentration profile of the pesticides or the toxic residue of the pesticides still decreases substantially with depth. Areas with high concentrations of the pesticide contaminant within several inches of the ground surface may have only natural background concentration levels within 1.5 to 2 feet below ground surface.

Historically, the pesticides of choice have evolved from arsenical pesticides such as lead arsenate and calcium arsenate, or through organochlorine pesticides such as aldrin, dieldrin and most commonly DDT and its metabolites. In recent years, the negative impact of these persistent chemicals on human health has been recognized. To address these risks, regulatory limits have been set. Each of these chemicals, by itself or broken down into its components (i.e. arsenic, lead), typically has an associated residential soil cleanup criteria expressed in parts per million to quantify the human health risks. Lands with concentrations of pesticides exceeding these regulatory limits are deemed unsuitable for residential building and the like, unless the pesticides are removed or their concentrations are reduced.

There are at least six (6) recognized remediation alternatives for remediating sites with persistent contaminates such as pesticides: (1) consolidating and covering contaminated soil (e.g., under roads and structures); (2) capping with clean soil; (3) blending with clean soil from on-site; (4) blending with clean soil from off-site; (5) excavating and removing contaminated soil; and (6) using innovative soil treatment technologies.

Each of the alternatives carries disadvantages and problems. Remediation that involves merely covering areas that would exceed clean-up thresholds if uncovered [alternatives (1) and (2)] will normally require use restrictions on the property and deed notices of the restrictions to prevent later exposure of the covered contamination. Excavation and removal [alternative (5)], importation of clean soil to the site [alternative (4)] and most innovative treatment technologies [alternative (6)], are much more expensive than alternatives that do not require offsite movement and/or treatment of soil. The most economical alternative, where it can be accomplished, is blending the soil on-site [alternative (3)].

Although economical, on-site soil blending is not without problems. The main problems with blending to reduce pesticide contamination are locating enough clean soil in reasonable proximity to the contaminated soil, and finding an effective way to blend the clean and contaminated soil to sufficiently lower contaminate concentrations to below the cleanup criteria.

In many instances, the most proximate source of clean soil is in the vertical profile below the surface layer of concentrated pesticide contamination. However, mixing the contaminated soil layer with clean soil below it is not effectively accomplished with conventional mobile machinery. For example, conventional surface earthmovers such as bulldozers merely scrape or carry the concentrated surface contamination to another location without significant mixing. Augers can create deep vertical wells, but with little mixing. Conventional farm machinery such as plows and harrows merely turn over soil in the contaminated surface layers, not effectively blending the contaminated layer with the subsurface clean soil. In the same respect, power shovels, which bite deeply into soil, merely lifting and moving the soil, also do not effectively mix and blend the clean soil with the contaminated soil.

The inefficiencies of the traditional machinery in vertically mixing and blending contaminated soil with clean soil in close vertical proximity are exemplified at sites where there are non-uniform distributions of contaminate residue throughout the site. Irregular distributions are commonly found on former orchards where pesticide residue is concentrated in patterns corresponding to individual trees of the orchard. The areas under the canopy of individual trees in an orchard will generally show a higher pesticide contamination level than the areas between trees and rows of trees. If the trees are removed for residential building, these areas will show up as local "hot-spots" of pesticide contamination.

When the conventional surface earthmovers are used on sites where the contamination is concentrated in hot spots (e.g., in orchards), the mixing that occurs is predominantly limited to the top layer of the hot spot with the top layer of the surrounding area (i.e., horizontal mixing). This horizontal mixing approach may result in a spreading of the contaminant along the surface without sufficient blending with clean soil to bring the contaminant concentration below clean up levels. Instead of remediating the site, this horizontal mixing approach merely creates a wider area having a contaminant concentration that may still exceed the cleanup criteria levels.

SUMMARY OF INVENTION

The present invention overcomes the problems associated with previously contemplated alternatives by using a method in which a contaminated surface layer is vertically mixed and blended in-situ with clean soil to a depth sufficient to reduce the concentration level of the contaminate to a substantially uniform concentration that is, ideally, below the regulatory criteria for that contaminate.

The invention uses a mobile blending apparatus to carry out this method. The mobile blending apparatus vertically mixes contaminated soil in situ with a sufficient volume of clean soil in vertical proximity to the contaminated soil. The mobile blending apparatus then blends the mixed soil under conditions and for a time sufficient to substantially homogenize the contaminates in the mixed soil. The steps of mixing and blending are then repeated for contaminated soil in other areas of the site.

BRIEF DESCRIPTION OF THE DRAWINGS

For the purpose of illustrating the invention there is shown in the drawings various forms which are presently disclosed; it being understood, however, that this invention is not limited to the precise arrangements and instrumentalities particularly shown.

DETAILED DESCRIPTION OF INVENTION

Figure 1A:
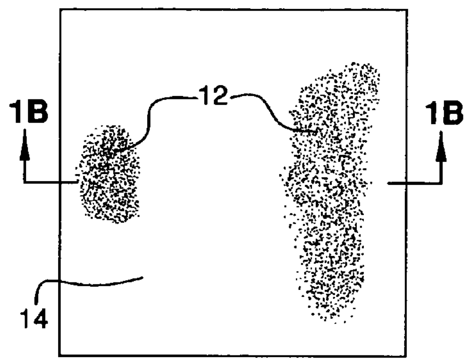
FIGS. 1A and 1B are a plan view and a cross section view, respectively, of a soil area with contaminated hot spots before a method of the invention is performed.
Figure 1B:
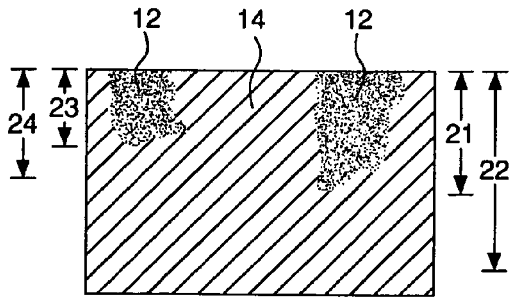

With reference to the drawings, where like numerals identify like elements, there is shown in FIGS. 1A and 1B a site with hot spots of contaminated soil 12 containing an elevated concentration of contaminated material, surrounded both horizontally and vertically below by clean soil 14. FIGS. 1A and 1B illustrate the site conditions before a method of the invention is performed. In other words, FIGS. 1A and 1B are classic "Before" drawings.

The contaminate (or toxic) materials in the contaminated soil 12 generally are materials that do not migrate through the soil because of low water solubility and/or strong adhesion to soil particles. These contaminants, therefore, generally are located in a surface layer, which is a layer at the ground surface and/or down to several vertical feet below the ground surface. Examples of such contaminates are pesticides, pesticide residues, and some heavy metals.

Prior to remediating a site, a remediation plan may be developed in which a treatment grid is mapped to encompass contaminated areas (e.g., hot spots). Generally, core samples are taken to determine the contour and contamination gradient of the contaminated soil. However, in some cases the contaminated areas may be mapped simply by estimation from, for example, the known position of trees or rows in an orchard. Analysis of the core samples for the contaminant concentration reveals the depth to which the concentration remains above the target concentration set by regulation or discretion as a safe or tolerable limit. The core samples also yield the average concentration of the contamination in the contaminated surface layer above that depth, and the depth of accessible clean soil below it. Simple blending calculations then reveal the sufficient volume of clean soil needed to mix with the contaminated soil to reduce concentration of the contaminates to or below the target. These blending calculations are generally based upon an assumption of achieving essentially uniform or homogenous concentrations of the contaminants in the blended soil.

For example, as shown in FIG. 1B, the depths 21, 23 of contaminated soil 12 and the concentrations of the contaminated soil 12 may be determined by taking and analyzing core samples, or by using other known technologies. From this depth and concentration information, a simple blending calculation may then be used to calculate the volume of clean soil needed to achieve a blended soil (contaminated soil mixed and blended with clean soil) with a concentration of the contaminates at or below a target level. Knowing the necessary volume of clean soil, the depths 22, 24 of the clean soil 14 may be determined. When remediation begins, these depths 22, 24 are the minimum depths at which the soil must be excavated to achieve contaminant concentrations in the blended soil at or below the target.

Alternatively, the blending calculation may be used to determine a volume of clean soil that must be brought on-site to achieve a blended soil (contaminated soil mixed and blended with clean soil) with a concentration of contaminates at or below a target level. In this embodiment of the method, the on-site contaminated material is vertically mixed and blended with offsite clean soil spread over the contaminated soil. The introduction of offsite clean soil is beneficial on sites with high groundwater tables and/or shallow bedrock (i.e., sites with severely limited amounts of clean soil below the contaminated soil), and also on sites where additional soil will be introduced to the site as part of the site development (e.g., raising the grade for drainage purposes).

In another alternative, the mixing and blending of the contaminated soil with the offsite clean soil may be performed in conjunction with the mixing and blending of the contaminated soil with the clean soil below the contaminated soil.

The soil volume calculation may be used for each of these approaches. For example, if a clean soil volume of 200 cubic feet is needed for ten foot by ten foot area of contamination, two feet of clean soil would be necessary. That clean soil may come from a two foot layer of clean soil below the contaminated material, from a two foot layer of offsite clean soil placed on top of the contaminated material, or any combination there between (e.g., one foot from above and one foot from below).

Figure 2A:
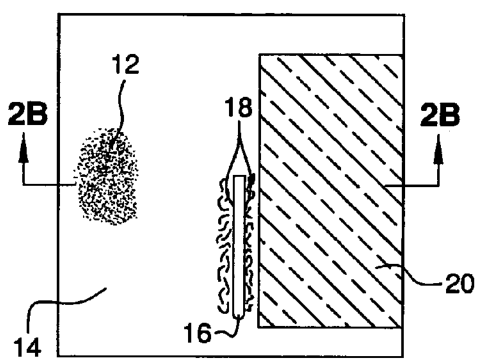
FIGS. 2A and 2B are a plan view and a cross section view, respectively, of the soil area in FIGS. 1A and 1B during the performance of a method of the invention.
Figure 2B:
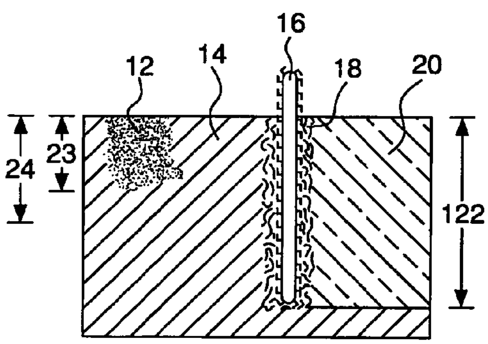

FIGS. 2A and 2B illustrate the site of FIGS. 1A and 1B while a method of the invention is being performed. In other words, FIGS. 2A and 2B are classic "During" drawings.

A mobile trencher apparatus 16, modified to lift and churn the soil and drop it back into the site without excavating a trench, may be used to progressively in situ mix and blend the contaminated soil 12 with the clean soil 14 that is in vertical proximity to the contaminated soil 12. In some areas, a small mobile apparatus may be used in lieu of, or in addition to, the trencher apparatus. The small mobile mixing apparatus will perform substantially the same function as the mobile trencher apparatus (both mixing and blending the contaminated soil with the clean soil), but may be more advantageous in remediating areas in close proximity to houses, utilities, and so on. Because the small mobile apparatus performs substantially the same function as the mobile trencher apparatus, both terms are encompassed in the more general term, mobile blending apparatus. The term mobile blending apparatus shall also encompass other similar mobile machinery capable of both mixing and blending soil.

The mobile blending apparatus need not be capable of performing the mixing and blending without excavating a trench. Instead, the mobile blending apparatus simply must be capable of both mixing and blending the soil. The mobile blending apparatus may be capable of excavating all or a portion of the soil for mixing and blending. The mobile blending apparatus may be capable of backfilling the blended excavated material. Alternatively, standard backfilling machinery (e.g., bulldozer) may be used to backfill the blended excavated material.

The calculation of the volume of clean soil (either from above or below the contaminated soil) needed to be blended with contaminated soil determines the minimum depths 22, 24 to which the mobile blending apparatus should be set.

There is no harm, however, in setting the apparatus to a greater depth, provided there is more clean soil before encountering bedrock or water table.

The mobile blending apparatus 16 vertically mixes, by lifting from below the surface layer (or in the case of importing off-site clean soil, from above the surface layer), a sufficient volume of clean soil 14 to combine with the contaminated soil layer 12 to create a mixed soil 18. The apparatus 16 is then continued to lift, churn and comminute the mixed soils in situ to blend the mixed soil 18 such that the concentration of the contaminated material in the mixed and blended soil 20 is substantially uniform (or homogenous). If the remediation plan is sound, this homogenizing of the concentration of contaminated material 12 ideally produces a substantially uniform concentration that is below the regulatory threshold or target criteria for the particular contaminate.

As described above, the depth setting for the mobile blending apparatus is determined by measuring the amount of clean soil 14 that must be blended with the contaminated material 12 to reduce the concentration of contaminates in the blended material 20 to below the target level. If the concentration of contaminants in the blended soil 20 is still above the target level after the initial blending, then the mobile apparatus 16 may be run again through the site at a depth greater than the original depth 122. With the deeper setting, the mobile blending apparatus 16 may in situ mix and blend the blended soil 20 with additional clean soil 14 below the blended soil 20. Alternatively, offsite clean soil may be placed on top of the blended soil. As with the deeper setting alternative, the mobile apparatus in-situ mixes and blends the blended soil with the clean soil in order to, ideally, reduce the concentration of the contaminates to or below the target. The additional mixing and blending may be necessary if, for example, the original concentration of the contaminated material is higher than originally anticipated and/or the depth of the contaminated material is deeper than originally anticipated.

The vertical in-situ mixing and blending is preferably accomplished with a modified trencher device as described in U.S. Pat. No. 5,631,160, or a large volume modified trencher device as in U.S. Pat. No. 6,543,963. These machines are manufactured and used by CBA Environmental Services, Inc. of Higins, Pennsylvania for soil remediation, and designated as MITU and MITU-LVR machines, respectively. It is contemplated that the method may be performed with other similar mobile mechanical means.

The MITU and MITU-LVR machines can provide in-situ mixing and blending of the soil to near uniformity down to depths of 4 feet or more. The MITU-LVR can mix and blend soils down to 4 feet or more in a single pass that is 11-feet wide. As described in the patents, the soil is broken and lifted by the teeth on the trencher chain or adjacent expansion drums. The breaking and lifting mixes the clean soil with the contaminated surface layer of soil. The soil is repeatedly lifted and dropped, which breaks the soil into small clumps blending the soil. The blending continues until the concentration of contaminates in the blended soil is substantially uniform. Ideally, the trencher is used in such a manner that the soil is not excavated from the trench. However, in certain circumstances (e.g., deep contamination), some or all of the soil may be excavated from the trench, mixed and blended, and then backfilled into the trench.

Figure 3A:
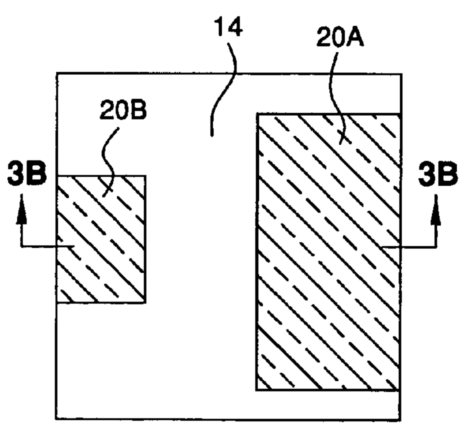
FIGS. 3A and 3B are a plan view and a cross section view, respectively, of the soil area of FIGS. 1A and 1B after the performance of a method of the invention.
Figure 3B:
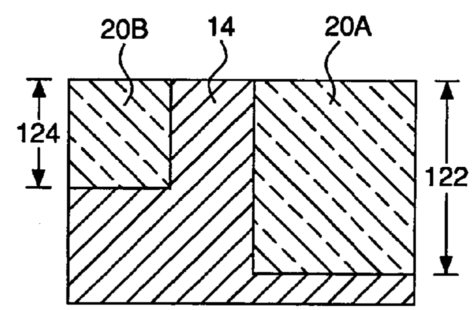

FIGS. 3A and 3B illustrate the site of FIGS. 1A and 1B after the method of the invention was performed. In other words, FIGS. 3A and 3B are classic “After” drawings.

As depicted in FIGS. 3A and 3B, the contaminated soil 12 has been mixed and blended with the clean soil 14 to create a blended soil 20A, 20B that has a substantially uniform concentration of the contaminated material. Ideally, that uniform concentration is below the regulatory criteria or target for that contaminant or contaminants.

The overall depths 122, 124 of the blended material 20A, 20B correspond to the overall depths 22, 24 of the clean soil 14 needed to obtain a sufficient volume of clean soil 14 that, when blended with the contaminated soil 12, reduces the concentration of the contaminates to at or below a target level. Depth 122 of the blended material 20A is deeper than depth 124 of the blended material 20B. The variation in mixing and blending depths illustrates a benefit of the present method. The mixing and blending may be conducted at varying depths depending on the original depth of the contaminated material, the original concentrations of the contaminated material, the soil matrix in the contaminated area, the soil matrix in the clean soil below the contaminated material, the amount of offsite soil placed over the contaminated material prior to mixing and blending, and other related factors.

It is contemplated that the method of the present invention may be carried out in remediating former agriculture sites, in particular, former orchards. Many former orchards have patterns of hot spots of contaminated material such as pesticides. The orchard site would be examined by conventional analytical techniques using core samples to determine the type and concentration of pesticide residues, the concentration versus depth profile, and the makeup of the soil matrix. Samples are taken from enough locations to determine whether the surface concentration is relatively uniform or is more concentrated at hot spots. If hot spots are indicated, mapping is undertaken to mark the location of the hot spots. The depth profile may indicate the depth at which cleanup criteria threshold is found and the depth of essentially no pesticide residue. The depth of available clean soil down to the bedrock or water level is determined by normal means to ensure that there is enough clean soil available for vertical blending to reduce the concentration of contaminants in the blended soil to below cleanup criteria levels.

After such sampling and mapping, a blending plan may be developed, based upon an assumption of uniform blending in a vertical column, to determine the cut-depth to set for a mobile blending apparatus such as a modified trencher device (e.g., MITU, MITU-LVR). The apparatus then may be used to mix and blend the soil to an essentially uniform blend from the surface to the set depth. After completing the mixing and blending at a first horizontal location, the apparatus may then be progressively moved to subsequent horizontal locations to continue the method. Ideally, after all the vertical mixing and blending is complete, the blended soil throughout the site will have contaminate concentration levels below regulatory criteria. In fact, the area with blended soil may have lower concentration than the surrounding surface. Where hot spots are mapped, it may only be necessary to vertically blend the hot spots.

At the completion of the process, the site can be contoured by conventional earthmovers for roadbeds, storm drains, sewer and water lines, basements, foundations and the like without risk of re-concentrating contamination into any area that exceed cleanup threshold levels.

The invention is particularly useful in remediating sites contaminated with pesticides, but it is not so limited. The invention may be used with any contaminate where vertical mixing and blending may be used to effectively reduce the concentration of the contaminate.

The invention may be used in combination with one or more of the prior art alternatives for remediating contaminated sites. For example, the invention may be used to reduce the concentrations of the contaminates in the soil so that the material can be excavated and disposed offsite. The benefit of reducing the concentration of the contaminants before excavation and hauling is that the human health risks may be reduced, and the material may be capable of being disposed at a non-hazardous waste landfill, which would lower disposal costs.

Although the present invention has been illustrated by reference to specific embodiments, it will appear to those skilled in the art that various changes and modifications may be made which clearly fall within the scope of the invention. The invention is intended to be protected broadly within the spirit and scope of the appended claims.

What is claimed is:

1. An in situ method of reducing the concentration of a contaminate in soil to or below a target concentration that is deemed environmentally acceptable in an area in which the contaminant concentration in a surface layer of the soil exceeds the target concentration, the method comprising the steps of:

determining a requisite volume of clean soil in vertical proximity to the surface layer such that blending the soil in the surface layer with the requisite volume of clean soil results in a substantially uniform contaminant concentration in the blended soil that is at or below the target;

employing a mobile trencher apparatus modified to lift and churn soil in place to a depth of at least four feet to vertically mix the surface layer soil in the area with the requisite volume of clean soil in vertical proximity;

running the mobile blending apparatus through the area under conditions to provide sufficient time for the mobile blending apparatus to blend the mixed soils so that the contaminate concentration throughout the blended soil is substantially uniform.

2. The method of claim 1, wherein at least a portion of the requisite volume of clean soil is clean soil placed on top of the surface layer.

3. The method of claim 2, wherein the clean soil placed on top of the surface layer is introduced from an offsite source.

4. The method of claim 1, wherein the step of running the mobile apparatus through the area is accomplished by moving to a first location in the area, running the mobile apparatus in that location for sufficient time for the mobile apparatus to blend the mixed soils to a substantially uniform contaminate concentration in the location and then moving the mobile apparatus to another location in the contaminated area and repeating the steps.

5. The method of claim 1, wherein the step of running the mobile apparatus through the area is accomplished by moving the mobile trencher apparatus through the area at a ground speed sufficiently slow to provide sufficient time for the mobile apparatus to blend the mixed soils to a substantially uniform contaminate concentration.

6. An in situ method of reducing the concentration of a contaminate in soil to or below a target concentration that is deemed environmentally acceptable in an area in which the contaminant concentration in a surface layer of the soil exceeds the target concentration, the method comprising the steps of:

mapping the area at the surface;

determining the depth of the surface layer and the average concentration of contaminant in the surface layer;

determining that there is a sufficient volume of clean soil in the area in vertical proximity to the surface layer such that blending the soil in the surface layer with the sufficient volume of clean soil results in a substantially uniform contaminant concentration at or below the target in the blended soil;

employing a mobile trencher apparatus modified to lift and churn soil in place to a depth of at least four feet to vertically mix the surface layer soil in the area with the sufficient volume of clean soil in vertical proximity;

running the trencher through the area under conditions to provide sufficient time for the trencher to blend the mixed soils, such that the mixed soils comprise a substantially uniform contaminate concentration.

7. An in situ method of reducing the concentration of a contaminate in soil to or below a target concentration that is deemed environmentally acceptable at a site which includes “hot spot” areas in which the contaminant concentration in a surface layer of the soil exceeds the target concentration, the method comprising the steps of:

determining and marking the location of hot spots areas;

determining that there is a sufficient volume of clean soil in vertical proximity to the surface layer such that blending the soil in the surface layer with the sufficient volume of clean soil results in a substantially uniform contaminant concentration at or below the target in the blended soil;

employing a mobile trencher apparatus modified to lift and churn soil in place to a depth of at least four feet to vertically mix the surface layer soil at a first location within the area with the sufficient volume of clean soil in vertical proximity with the contaminated soil;

continuing to run the apparatus in the first location for a time sufficient to blend the mixed soils to a substantially uniform contaminate concentration;

moving the apparatus to another location in the contaminated area and repeating the steps of mixing and blending; and continuing the steps over the contaminated area.

8. A method of reducing concentrations of a toxic material in soil, the method comprising the steps of:

using a mobile trencher apparatus modified to lift and churn soil in place to a depth of at least four feet to mix in place a first vertical profile of the soil to a depth of at least three feet below ground surface, the first vertical profile comprising clean soil and soil with concentrations of the toxic material;

using the mobile trencher apparatus to blend the first vertical profile in place to a substantially uniform concentration of the toxic material; and advancing the mobile trencher apparatus to a second vertical profile and repeating the steps of mixing and blending.

* * * * *